Dec. 28, 1965    P. LERMANN    3,225,674
PHOTOGRAPHIC SHUTTER
Filed Nov. 4, 1963    6 Sheets-Sheet 1
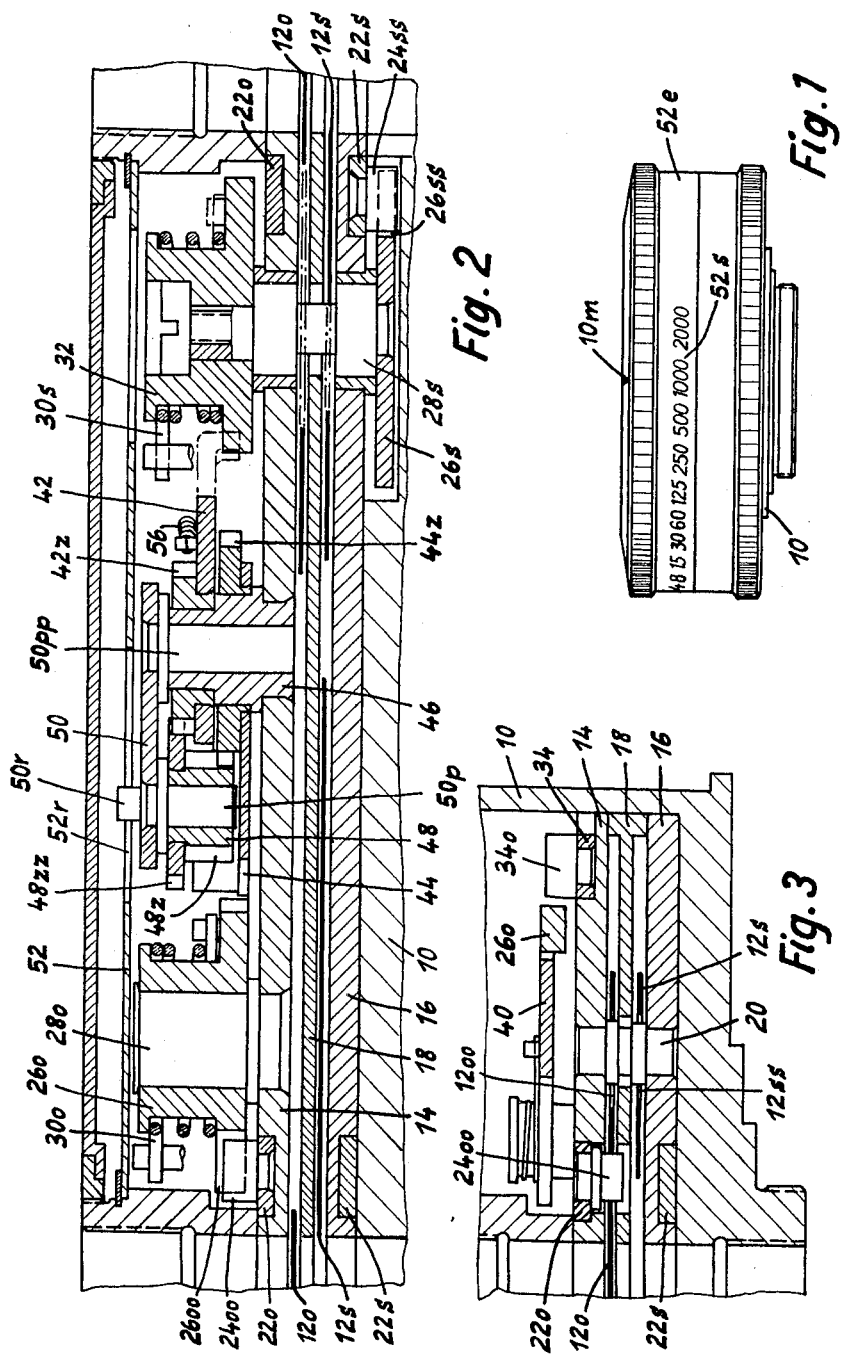

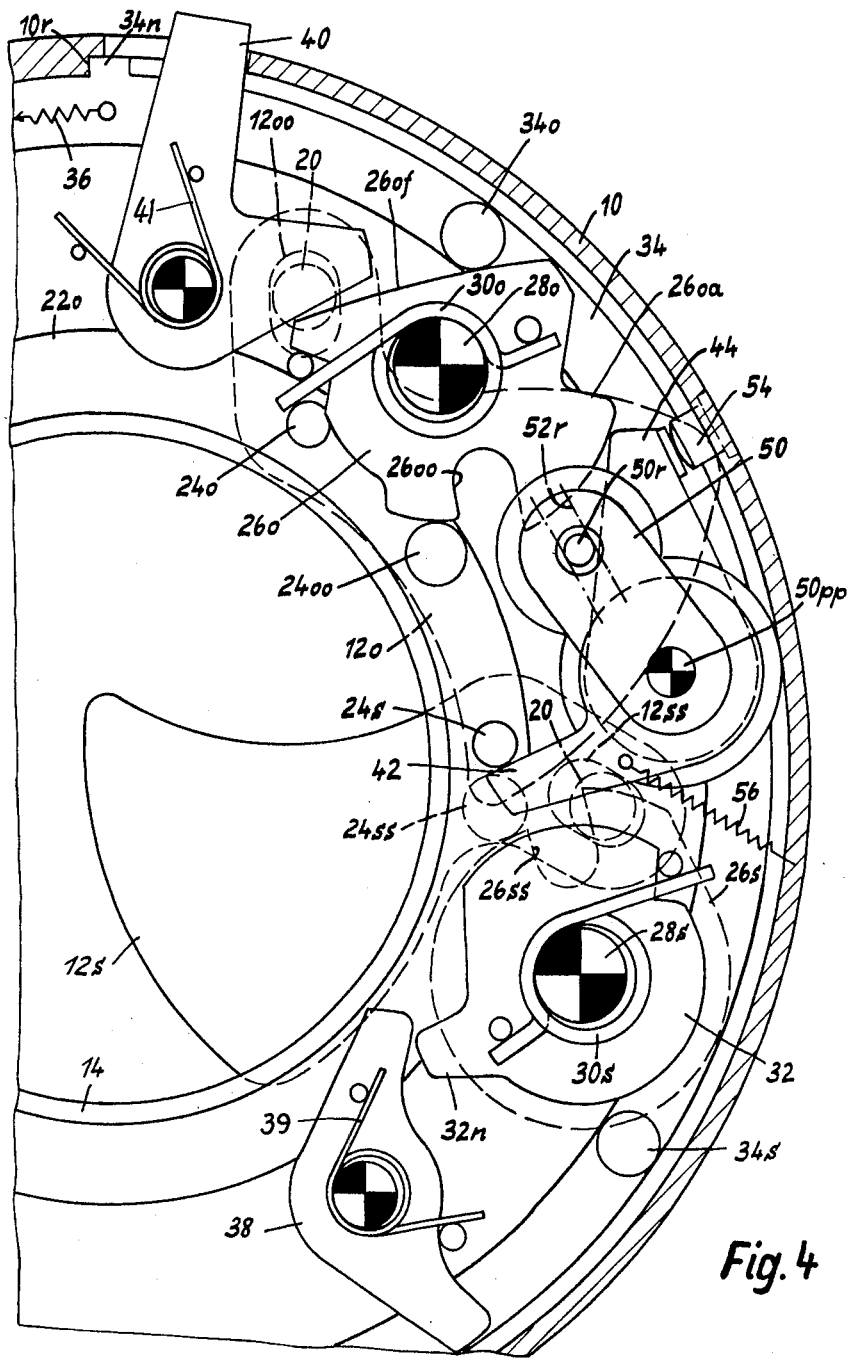

United States Patent Office 3,225,674
Patented Dec. 28, 1965

3,225,674
PHOTOGRAPHIC SHUTTER
Peter Lermann, Munich, Germany, assignor to Compur-Werk Gesellschaft mit beschrankter Haftung & Co., Munich, Germany, a German firm
Filed Nov. 4, 1963, Ser. No. 321,173
Claims priority, application Germany, Nov. 7, 1962, C 28,357
11 Claims. (Cl. 95—63)

This invention relates to a photographic shutter, and more particularly to a shutter having two separate series or sets of shutter blades independently movable for controlling the exposure, the first set of blades opening to initiate the exposure while the second set is already open, and the second set of blades then closing to terminate the exposure while the first set is still open. With such an arrangement, it is not necessary for the blades to reverse their directions of movement during the making of an exposure, and it is possible to obtain extremely fast exposures of short duration, without the necessity of resorting to double-ended blades or other special shapes of blades.

An object of the invention is the provision of a generally improved and more satisfactory shutter of this kind.

Another object is the provision of a shutter of this kind, having improved means for controlling the action of the two sets of blades with respect to each other.

Still another object is the provision of a construction having simple and compact differential gear means for controlling the timed relationship of the two sets of blades with respect to each other.

A further object is the provision of a shutter of this kind, in which the lapse of time between the release or unlatching of the first set of blades for opening the exposure aperture and the release or unlatching of the second set of blades for closing the exposure aperture, is adjustable very easily and conveniently, in a smooth or continuous manner.

A still further object is the provision of a shutter in which there is a gear train for controlling the timed relation of the second set of shutter blades with respect to the first set of shutter blades, and in which, in the rest or run-down position of the shutter, the first member of the gear train is positively engaged with an operating member and a fixed abutment, while the last member of the gear train is freely movable, and in the tensioned or cocked condition of the shutter, the last member of the gear train is engaged with a driving member and the first member of the gear train is freely movable.

These and other desirable objects may be attained in the manner disclosed as an illustrative embodiment of the invention in the following description and in the accompanying drawings forming a part hereof, in which:

FIG. 1 is a side view of a shutter in accordance with a preferred embodiment of the invention;

FIG. 2 is a somewhat schematic section through the shutter, approximately on the line II—II of FIG. 5;

FIG. 3 is a fragmentary section taken roughly radially, approximately on the line III—III of FIG. 5;

FIG. 4 is a fragmentary plan of the shutter, on an enlarged scale, with the cover plate and certain overlying parts removed, in order to show the mechanism beneath, and with various other parts omitted for the sake of clarity, and with some parts being shown schematically, the shutter being illustrated in the rest or run-down position at the conclusion of an exposure;

Figure 5:
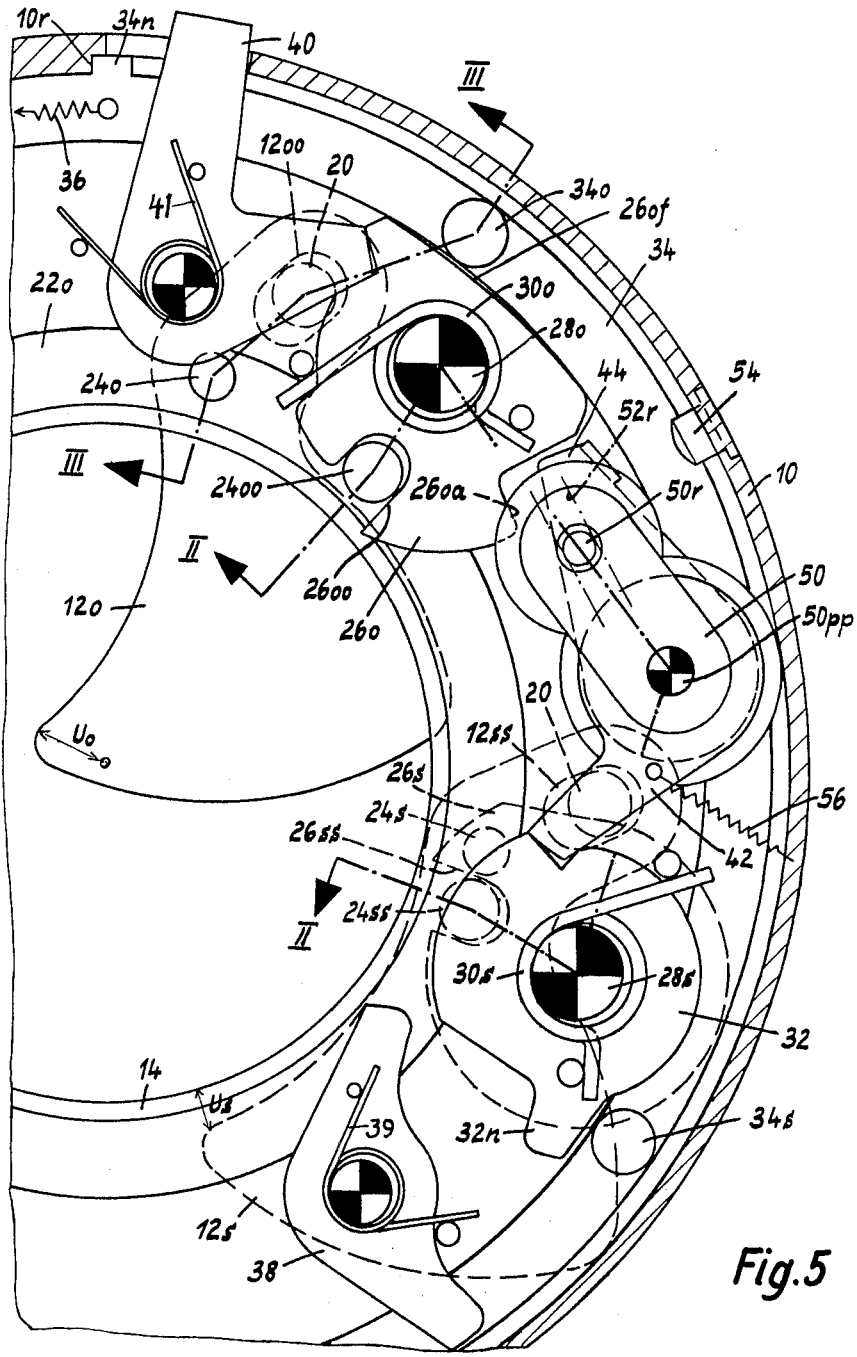
FIG. 5 is a view similar to FIG. 4, showing the parts in the cocked or tensioned position.

Referring now to the drawings, the shutter comprises a housing or casing indicated in general at 10, preferably of the usual annular shape customary with objective shutters. As usual, there is a central aperture through the shutter, through which light passes when the shutter blades are open. The shutter mechanism is mounted in the annular space surrounding the central aperture.

In the shutter of the present invention, there are two separate sets or series of shutter blades, movable independently of each other in the sense that each set can be moved without moving the other set, although in normal operation of the shutter one set of blades is moved in predetermined but adjustable timed relationship to the other set of blades, in order to time the duration or speed of the exposure. One set of blades (which may also be called a series or system of blades) is used to open the light passage or exposure aperture at the beginning of an exposure, and the other set or series or system of blades is used to close the light passage or exposure aperture at the conclusion of the exposure. The second set or system of blades, used for terminating the exposure, is already open before the exposure begins, and the first set or system of blades, used to start the exposure, remains open after the exposure is terminated by closing the second set of blades.

Each blade system comprises any desired number of shutter blades, conveniently five blades, although a greater or smaller number may be used if desired. For simplicity and clarity of illustration, only one shutter blade of each set or system is illustrated in the drawings, but those skilled in the art will readily understand that the other blades are arranged at intervals around the exposure aperture so that they overlap with each other when they are in closed position.

In the drawings, one blade of the first or opening system of blades is illustrated at 12o, and one blade of the second or closing system of blades is illustrated at 12s. Each blade may be conventional in shape and material, and all ten blades (assuming that there are five blades in each set) are identical with each other, so that they are interchangable with each other during manufacture and assembly.

The two blade systems are installed in two separate blade chambers, one of which lies axially behind the other. For example, the stationary parts of the shutter housing may include a transverse plate 14, and another transverse plate 16 behind it, the space between these two plates being subdivided by a stationary partition plate 18. The first set or opening set of blades 12o are in the forward compartment between the plate 14 and the partition plate 18, while the second set or closing set of shutter blades 12s are in the rear compartment between the partition plate 18 and the plate 16.

There are fixed bearing pins 20 equal in number to the number of blades in each set. These pins 20 pass through the plates 14, 16, 18, and through slots 12oo and 12ss, respectively, in the blades 12o and 12s, respectively. Thus each bearing pin 20 passes through the slots in one blade of the opening set or system and one blade of the closing set or system.

The construction also includes two separate blade rings or driving rings, shown respectively at 22*o* and 22*s*. The former rotates in a groove concentric with the optical axis, formed in the front face of the plate 14, and the latter rotates in a similar groove formed on the rear face of the plate 16. Each blade ring carries pivot pins on which the blades of its respective set or system of blades are pivoted, the pivot pins passing, of course, through suitable circumferentially extending slots in the respective plates 14 and 16.

The pivot pins or driving pins of the blade ring 22*o* are shown at 24*o*, and if there are five shutter blades in each set or system, there will be five of these pins 24*o*, each serving as pivot for one of the blades, engaging in the driving hole of that particular blade. The similar driving pins or pivot pins of the second blade ring 22*s* are shown at 24*s*, and extend into the driving holes of their respective blades 12*s*. In the manner well understood by those skilled in this art, the rotation of either one of the blade rings in one direction will cause all of the blades of its set or system to swing across the exposure aperture in slightly overlapping relation to each other, to close the shutter against passage of light, while rotation of the blade ring in the opposite direction will cause the blades to swing outwardly into the annular housing surrounding the exposure aperture, to open the exposure aperture and permit passage of light through it, so far as this particular set or system of blades is concerned. In the particular construction here illustrated, movement of either blade ring in a clockwise direction when viewed from the front of the shutter will serve to open the blades controlled by that particular blade ring, while movement of the blade ring in a counterclockwise direction will close the blades.

Each blade ring carries an impelling pin or driving pin 24*oo* and 24*ss*, respectively, for engagement with a main driving member or master member to drive the blade ring to open or close the blades, as the case may be. There are two main driving members or master members, one for each blade ring and set of blades. The first master member, for the first or opening set of blades, is indicated at 26*o*, pivotally mounted on a fixed pin 28*o*. This master member is powered by a spring 30*o*. It has a slot 26*oo* for engaging the drive pin 24*oo* on the blade ring 22*o*.

The second master member is shown at 26*s*. It is pivotally mounted on a fixed bearing pin or spindle 28*s* which is spaced, in a direction circumferentially of the shutter, from the bearing pin 28*o*. The second master member is powered by a driving spring 30*s* which, like the spring 30*o*, has one end anchored in fixed position and the other end is appropriately coupled to its respective master member.

The master member 26*s* has a driving slot 26*ss* for engaging the drive pin 24*ss* of the second blade ring 22*s*. Since the main flange portion of the master members 26*s* (containing the slot 26*ss*) is located behind its associated blades 12*s* and behind the plate 16, this main portion of the second master member is rigidly connected with an auxiliary portion 32 arranged in front of the plate 14 and engaged by the driving spring 30*s*.

The main driving springs or master springs 30*o* and 30*s* are tensioned or loaded by the action of a tensioned ring or cocking ring 34 mounted in the shutter housing 10 for rotation about the optical axis, and equipped with two cocking pins or tensioning pins 34*o* and 34*s*, respectively. The tensioning ring 34 has a nose 34*n*. A light return spring 36 tends to rotate the ring 34 in a counterclockwise direction to a rest position in which the nose 34*n* is engaged with a rest stop or abutment 10*r* in the shutter housing. The ring is moved in a clockwise or tensioning direction, to cock the shutter, in any suitable conventional manner, such as by a finger piece extending out through a slot in the shutter housing to an external accessible position, or by a suitable connection of conventional kind, known per se, with the film transport or film winding mechanism in the camera with which the shutter is used, so that when the film is wound ready for the next exposure, the ring 34 will be simultaneously moved to tension the shutter ready for the next exposure operation.

The tensioning ring 34 has fixed to it two tensioning pins 34*o* and 34*s*, which extend into position to engage the respective master members so as to tension them when the ring 34 is turned in a clockwise direction. One of these pins may project rearwardly through a slot in the rear wall of the shutter and may be used as part of the above mentioned connection with the film transport mechanism or other suitable part of the camera mechanism. When the tensioning ring 34 turns in a clockwise direction from its rest position, early in its movement the pin 34*o* engages a cam surface 26*of* on the first master 26*o*, and presses against it in a direction to swing the master member clockwise on its pivot 28*o*, winding or tensioning the spring 30*o*, and this tensioning motion of the master member 26*o* continues until an abutment portion or shoulder on this master member can engage the latch 40, which snaps behind the shoulder on the master member under the influence of its spring 41. One end of the latch 40 extends out through a slot in the housing to an accessible position where it may be manipulated by the finger of the operator, to release or trip the shutter to start an exposure.

The second cooking pin 34*s* on the tensioning ring 34 serves to tension the second master member 26*s*, 32 through the intermediate action of a reversing lever 38 pivoted on a stationary pivot in the shutter housing. The pin 34*s* does not make contact with the reversing lever 38 until after the pin 34*o* has completed the tensioning movement of the first master member 26*o*, since the first set of shutter blade 12*o* should be completely closed by the tensioning movement of the first master member, before the second set of shutter blades 12*s* begin to open during the tensioning movement of the second master member. During the tensioning movement of the first master member, the trailing edge of the slot 26*oo* in the first master member engages the pin 24*oo* on the first blade ring 22*o*, and swings the first blade ring in a counterclockwise direction to close the first set of blades 12*o*. Then, when the blades of the first set have been fully closed, continued clockwise rotation of the tensioning ring 34 brings the pin 34*s* thereof into contact with one end of the reversing lever 38, and swings this lever clockwise on its pivot, against the force of its light restoring spring 39, so that the opposite end of the lever 38 presses against a nose 32*n* on the disk portion 32 of the second master member and turns the second master member in a counterclockwise direction, thereby tensioning or cocking the spring 30*s* of the second master member. During this counterclockwise rotation of the second master the trailing edge of the notch 26*ss* of the second master member engages the pin 24*ss* on the second blade ring 22*s* and turns this second blade ring in a clockwise direction, thereby opening the second set or system of shutter blades 12*s*. As above explained, this opening of the second set of shutter blades does not occur until after the first set of blades has been closed, during the cocking or tensioning movement of the shutter parts.

When the second master member 26*s*, 32 reaches its fully tensioned position, it is held in this position by a latching pawl 42. The tensioning ring 34 can then be released, to be restored in a counterclockwise direction to its rest position by its return spring 36, and the reversing lever 38 is restored to its rest position by its restoring spring 39, so that this lever and also the pins 34*o* and 34*s* on the ring 34 are out of the way of the running down movements of the parts and do not interfere with or impede the making of an exposure.

The above mentioned pawl 42 which serves to latch the second master member in tensioned position, represents or constitutes the last member of a gear train of differential type. The first member of this differential gear train is in the form of another pawl 44. Both of the pawls 42 and 44 are rotatably mounted on a stationary bushing or bearing sleeve 46 which is fixed in the shutter housing, for example being fixed to the plate 14. The pawl 42 is rigidly connected to a toothed pinion 42z, and the pawl 44 is rigidly connected to a toothed pinion 44z. These two pinions both rotate on the bearing sleeve 46, but the pinions are of different pitch diameters.

Meshing with both of these pinions 42z and 44z is a double pinion 48 having two peripheral toothed portions, one toothed portion 48z meshing with the pinion 44z, while the other toothed portion 48zz of the double pinion is of different pitch diameter and meshes with the pinion 42z. This double pinion 48 is rotatably mounted on a pin 50p which is carried by a swinging arm 50 near one end thereof, while the other end of the arm 50 is pivotally mounted by means of a pin 50pp fixed to the arm 50 and extending into the central bore of the bearing sleeve 46. Thus the entire arm 50 may swing around the central axis of the bearing sleeve 46, concentrically with the rotary motion of the pinions 42z and 44z, and as the arm 50 swings it carries the double pinion 48 bodily with it, causing this double pinion to travel circumferentially on and remain in mesh with both of the pinions 42z and 44z. It will be seen that this arrangement of pinions constitutes a differential gear train, the pinions 42z and 44z thus representing what may be called the sun gears or sun wheels of the differential, while the double pinion 48 constitutes what may be called the planet gear or planet wheel of the differential. As the arm 50 swings, carrying the double pinion 48 with it, the action of this double pinion will cause one of the two pinions 42z and 44z to turn relative to the other one of such pinions.

The position of the arm 50 is controlled by a control pin 50r which extends forwardly from the arm 50 (conveniently as a forward extension of the pin 50p) and engages a control cam 52r on the shutter time setting or speed setting ring 52 which is rotatably mounted as usual on the front lens tube near its forward end. This speed setting cam 52 is an internal speed setting member and is coupled in the usual conventional way with an external speed setting ring 52e which rotates circumferentially on the outside of the shutter housing, about the central optical axis as a center, and which carries the circumferentially arranged shutter speed scale 52s settable to any desired adjustable position with respect to the fixed reference mark or index mark 10m which is marked on the front cover plate or other suitable stationary part of the shutter. The shutter speed scale 52s is of conventional form, except that the present shutter construction enables exposures to be made at much higher speeds than those possible with conventional objective shutters, so that the present speed scale may be extended to have graduations as high as 2000 (meaning an exposure of 1/2000 of a second) or even higher, whereas most of the conventional objective shutters heretofore available have not been able to make exposures faster than about 1/500 of a second, or at most 1/800 of a second.

The first member of the differential gear train, namely, the pawl 44, lies in the path of running down movement of a shoulder or abutment 26oa on the first master member 26o, so that as the first master member runs down from its tensioned position toward its rest position, it will engage the pawl 44 and displace this pawl in a clockwise direction on its bearing sleeve 46. Since the pawl 44 is rigidly connected to the pinion 44z, the swinging of the pawl by the running down motion of the first master member will cause corresponding swinging of the pinion 44z. At this time the control pin 50r on the arm 50 is embraced by the cam slot 52r in the speed setting cam 52, the arm 50 cannot swing, and therefore the rotary motion of the pinion 44z will cause rotation of the double pinion 48, and this in turn will cause rotation of the other pinion 42z in the same direction as the rotation of the pinion 44z, but at a different rate because of the differential action. The clockwise rotation of the pinion 42z will cause corresponding clockwise swinging of the pawl 42 which is rigidly connected to the pinion 42z, and will swing this pawl out of the notch in the disk 32 of the second master member, thereby releasing the second master member to perform its running down movement in a clockwise direction, so that it will act on the pin 24ss of the second blade ring 22s, to turn this blade ring in a counterclockwise direction and close the second set of shutter blades 12s.

In contrast to this motion of the parts which occurs during the running-down or exposure sequence, if the speed control cam 52 is turned so as to shift the pin 50r in one direction or the other (closer to or farther away from the optical axis at the center of the shutter) this will cause one of the pawls 42 and 44 to move angularly with respect to the other pawl. When the shutter is in its rest or run-down position shown in FIG. 4, the pawl 44 is at this time held immovably between the edge of the first master member 26o and a fixed abutment 54 on the shutter housing, but at this time the other pawl 42 is free and unrestrained (except by its light spring 56 which tends to swing it in a counterclockwise direction) so that if the speed control cam 52 is turned at this time, the pawl 42 will be moved angularly with respect to the now stationary pawl 44. But if the adjusting movement of the speed control cam 52 occurs while the shutter is in its tensioned or cocked condition, as shown in FIG. 5, then it is the pawl 42 which is stationary at this time, being held by the spring 56 in the latching notch of the disk 32, and the other pawl 44 is free and unrestrained at this time, so that it is the pawl 44 which is moved angularly by an adjusting movement of the speed control cam 52. Hence both in the run-down or rest position, and in the cocked or tensioned position of the shutter, one of the two pawls is free to move, so as to be adjusted for obtaining a different shutter speed at the time of the next exposure.

The above mentioned abutment 54 is firmly seated in the shutter housing 10, and is made of resilient material, for example rubber, so as to perform a damping action and to eliminate play.

In the rest position or run-down position of the parts, shown in FIG. 4, the blades 12o of the opening set or system are not only completely outside the exposure aperture of the shutter, but are even swung a little beyond the outer edge of the exposure aperture, as seen by the broken line position of one of these blades. In the cocked or tensioned position as seen in FIG. 5, however, the blades 12o of the first or opening blade system are swung not only to a position which completely closes the exposure aperture (by overlapping with each other) but even a substantial distance beyond the complete closing position, the distance beyond complete closing being illustrated in FIG. 5 by the line Uo, the right hand end of this line indicating the optical axis at the center of the exposure aperture, and the left hand end of this line being at the tip of the blade, a substantial distance beyond the optical axis. From this, it will be seen that the blades 12o of the first or opening set of blades, must swing a substantial distance represented by the distance Uo, before the exposure aperture begins to open to admit light. This preliminary motion of the blades, before the beginning of exposure, gives the blades an opportunity to speed up their motion, from their previous stationary condition to a fast moving condition, before the exposure actually begins, and this is one of the factors which enables the making of exposures of very short duration or very high speed.

Likewise the blades 12s of the second or closing set of blades, are positioned not just at the edge of the exposure aperture but actually at some distance outside the edge of the exposure aperture, when these blades are in their cocked or tensioned position shown in FIG. 5.

The distance of the tip of the blade outside of the edge of the exposure aperture is shown by the line $Us$ in FIG. 5. In a manner similar to that explained above in connection with the blades 12o, this spacing of the blades 12s with their tips at some distance outside of the edge of the exposure aperture, enables the blades to swing to some extent, speeding up from a stationary condition to a fast moving condition, before the edges of the blades actually enter the exposure aperture and begin to affect the passage of light through the exposure aperture. This is another factor which enables the making of very fast or high speed exposures of short duration.

The action of the parts when cocking or tensioning the shutter from the rest position shown in FIG. 4 to the tensioned position shown in FIG. 5, has already been sufficiently described, and it has been pointed out that, during this tensioning movement, the first set of blades 12o will completely close the exposure aperture before the second set of blades 12s is opened. The parts are held in the tensioned position by the manually releasable latch or trip 40 which latches the first master member, and by the latch 42 which latches the second master member.

Before making the desired exposure, the required shutter speed has been set by turning the external setting ring 52e until the required speed value 52s has been brought opposite the fixed reference point 10m, and this setting of the shutter speed has caused the two pawls 42 and 44 to be shifted to the desired angular relationship to each other. As above explained, this adjustment of shutter speed may be made in any condition of the shutter; that is, while it is in the rest position, or while it is in the tensioned position. If the speed adjustment is made while the shutter is in tensioned position, the adjustment to a faster speed will swing the pawl 44 leftwardly or counterclockwise, closer to the abutment shoulder 26oa on the first master member 26o, so that this first master member will engage and displace the pawl 44 and thereby release the pawl 42 at an earlier stage during the running down movement of the first master member. Adjustment of the parts for a slower shutter speed, to make an exposure of longer duration, will shift the pawl 44 to the right or clockwise, farther away from the shoulder 26oa, so that the first master member will release the pawl 44 at a later stage during the running down movement of the first master member. If the speed adjustment is made while the shutter is at rest position, it will be the pawl 42 which swings during the adjustment, rather than the pawl 44, but in any event there is an angular adjustment between the two pawls, and the net result is the same, once the shutter has been tensioned.

The action of the shutter during the making of an exposure will now be described. The manually controlled trip or latch 40 is operated, either by direct finger pressure, or through any desired intermediate mechanism such as the conventional release plunger mounted on the camera body and operatively connected in conventional manner to the latch in the shutter. The release of the latch or trip enables the first master member or driving member 26o to turn in a counterclockwise direction under the force of its power spring 30o, so that the notch 26oo of this first master member acts on the pin 24oo of the first blade ring 22o, to turn this blade ring in a clockwise direction about the optical axis, thereby moving the blade pins 24o relative to the studs 20, causing the first set of blades 12o to open. As already mentioned, the first part of the opening motion of the blades is a speed-up motion before the exposure aperture begins to open, because of the substantial overlap of the tips of the blades beyond the optical axis, so that the blades are moving quite rapidly by the time the exposure really commences.

Figure 6:
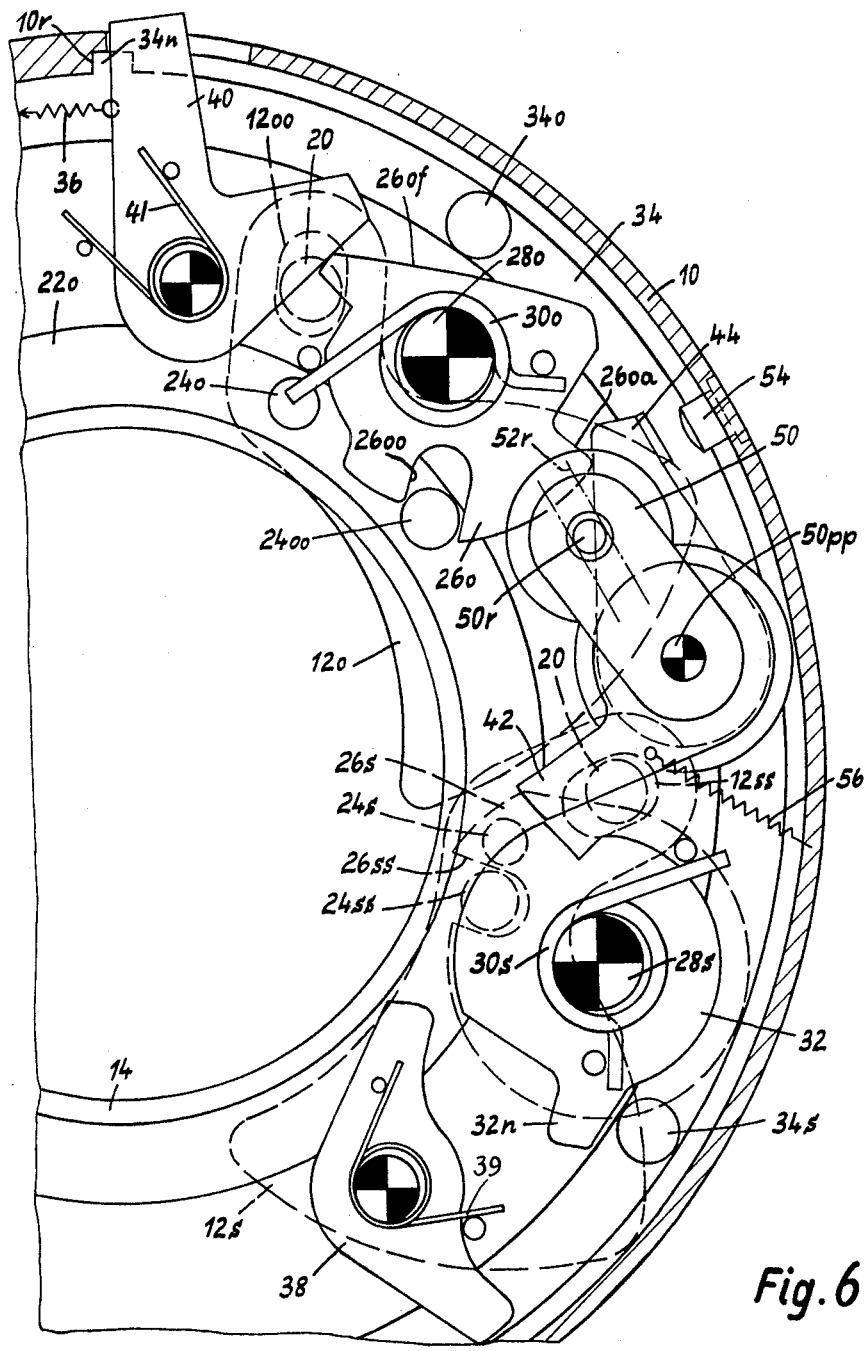
FIG. 6 is a view similar to FIGS. 4 and 5, showing the parts at an intermediate position during the making of an exposure, with the first set of shutter blades approximately fully open and with the second set of shutter blades just on the point of being released to start their closing movements.
Figure 7:
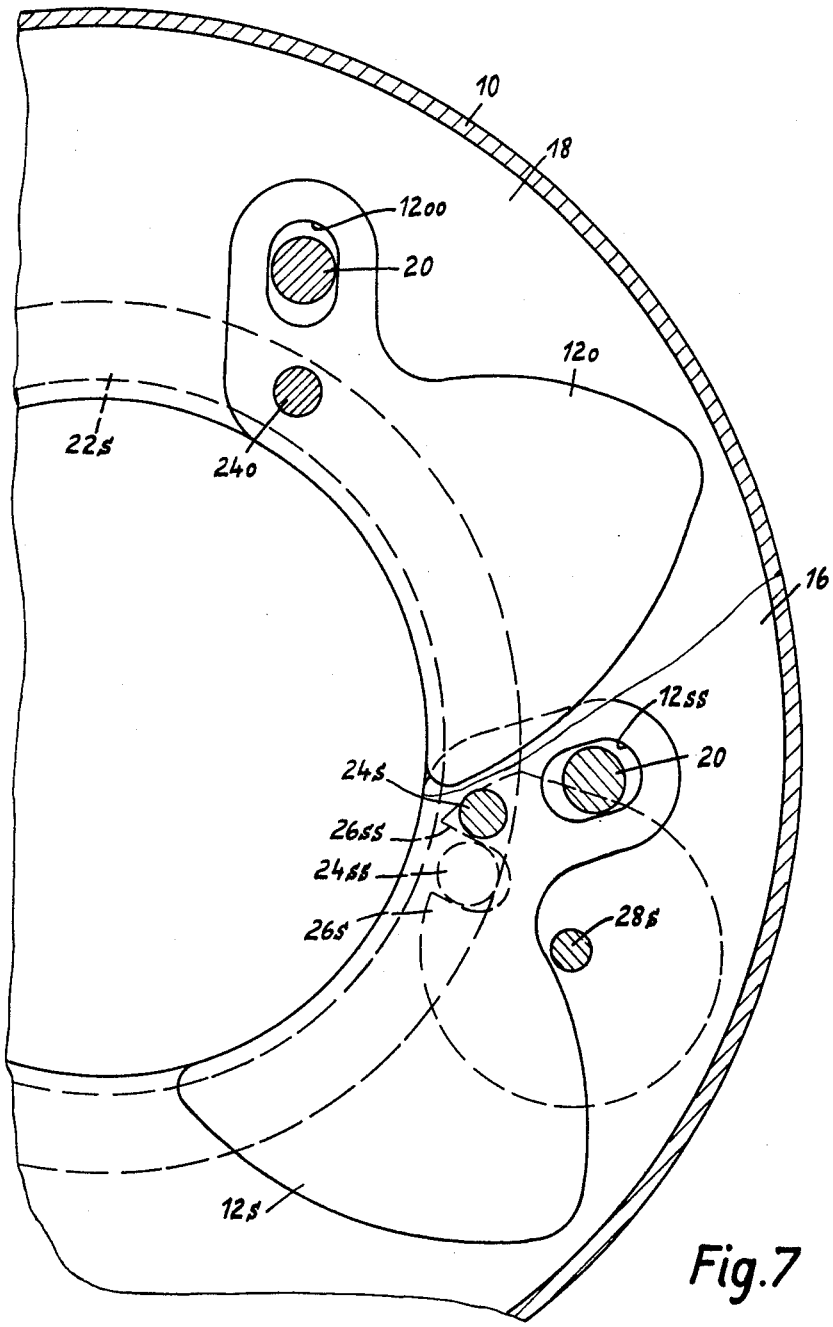
FIG. 7 is a fragmentary view similar to FIGS. 4–6 but with most of the operating parts removed so as to show more clearly one blade of the first or opening set of blades and one blade of the second or closing set of blades, with certain associated parts.

As the running down motion of the first master member continues, the shoulder 26oa thereon engages the pawl 44 of the differential gear mechanism, such engagement occurring early during the running down movement of the first master member when the shutter is set for a relatively high speed exposure, and occurring later during the running down motion of the first master member when the shutter is set for a slower speed exposure. A typical position of the parts is shown in FIG. 6. In this view, the first master member 26o has turned sufficiently far so that the blades 12o of the first set are almost but not quite completely open, and the master member has displaced the pawl 44 of the differential gear train sufficiently far so that the other pawl 42 at the end of the differential gear train is just now releasing or unlatching the second master member or driving member 26s, 32. This second driving member 26s, 32 now begins its running down movement in a clockwise direction, under the influence of its power spring 30s. Meanwhile, the first master member 26o completes its running down movement, if it has not already done so.

When the second master member or drive member 26s, 32 runs down, the action of the notch 26ss thereof moves the pin 24ss of the second blade ring 22s, to turn this second blade ring in a counterclockwise direction about the optical axis, thereby swinging the pins 24s of this second blade ring relative to the studs 20, causing the second or closing set of shutter blades 12s to swing from the open positions of FIGS. 5 and 6 to the closed position of FIG. 4, thereby terminating the exposure. Just as the opening blades 12o have a preliminary motion represented diagrammatically at $Uo$ before they begin to open, for speeding up purposes, so likewise the closing blades 12s have a preliminary motion represented diagrammatically at $Us$, for speeding up purposes, before these blades actually begin to close the exposure aperture.

It will be noted that when both of the master members have completed their running down movements and are in rest position (FIG. 4) the notch 26oo of the first master member 26o has moved a little past the pin 24oo and an arcuate part of the master member 26o, concentric with the pivotal axis thereof, engages the pin 24oo to hold it positively in its rest position, and likewise the notch 26ss of the second master member 26s has moved somewhat beyond the pin 24ss and an arcuate part of the second master member, concentric with the pivotal axis thereof, holds the pin 24ss positively in its rest position. Because of this positive lock of the two blade rings in their respective rest positions, it is not necessary to provide springs biasing these blade rings and yet in spite of the absence of springs, there is no danger that the shutter will be accidentally opened as a result of jolts or jars imparted to the camera. When the shutter parts are in tensioned position as distinguished from rest position, the respective pins 24oo and 24ss on the respective blade rings are positively engaged in the respective notches 26oo and 26ss of the respective master members, so that again there can be no accidental movement of the blade rings and the blades as a result of jolts or jars.

Reference is now made to the shutter operating diagrams constituting FIGS. 8–11 of the drawings. These diagrams are of the conventional kind, well understood in the art. In each diagram, the horizontal dimension or abscissa represents time, and the vertical dimension or ordinate represents the degree of opening of the exposure aperture.

On the vertical scale, the distance $Uo$ near the bottom of each diagram represents the distance of excess overlap of the first or opening set of blades in their tensioned or cocked position, as already explained in connection with FIG. 5. The vertical distance $Us$ near the top of each diagram represents the initial offset of the tips of the closing set of blades, offset outwardly from the extreme edge of the exposure aperture in the cocked or tensioned position of the shutter parts, as already explained in connection with FIG. 5. The horizontal line $Do$ spaced upwardly from the bottom or base line by the distance $Uo$ represents zero opening of the exposure aperture; that is, the condition when the opening blades 12o have moved far enough to eliminate the overlap Uo and are just ready to begin admitting light. The horizontal line Dvoll near the top of each diagram, spaced downwardly from the top line by the distance Us, represents the condition of full or maximum opening of the entire area of the exposure aperture.

As will now be readily apparent to those who are familiar with shutter diagrams of this type, the first oblique line (reading from left to right) represents the opening movement of the first or opening set of shutter blades 12o, while the second oblique line represents the closing movement of the second or closing set of shutter blades 12s. Of course in diagrams of this type which relate to conventional shutters as heretofore known, it is usually one and the same set of blades which serves both to open or initiate the exposure and to close or terminate the exposure. The present diagrams illustrate clearly the advantages of the present system using two separate sets of blades, because for extremely fast shutter speeds for producing exposures of short duration, the closing set of blades can start their closing movements even before the opening set of blades have completed their full opening movements.

The nominal exposure of the shutter is, of course, a function of the area enclosed within the shutter operating diagram (triangular or trapezoidal, as the case may be) and is conveniently represented by the horizontal dot dash line te, with or without subscripts, drawn at an elevation midway between the line of zero opening and the line of maximum opening for the particular shutter conditions being illustrated by the diagram (not necessarily the maximum opening of which the shutter is capable).

Figure 8:
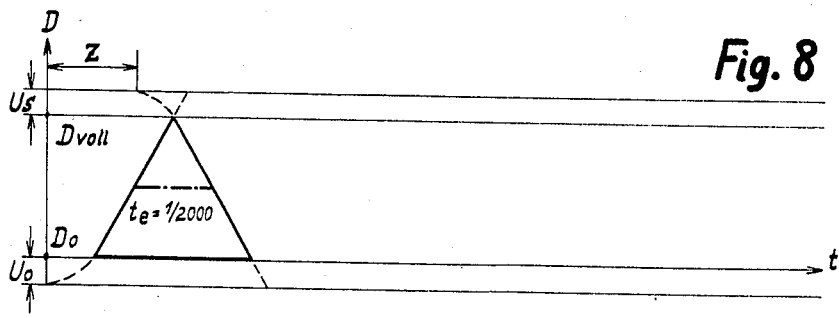
FIGS. 8–11 are operating diagrams illustrating the shutter operation under various different conditions.

FIG. 8 represents the case where the differential gear train is set to such a position that the pawl 42 is released or unlatched at a time Z after the shutter is tripped, this time Z being such that the closing blades will get up to speed and start closing the exposure aperture just at the instant that the opening blades reach full aperture position, completely uncovering the exposure aperture. As one specific example of a shutter of the present design, using reasonably powerful springs 30o and 30s, the equivalent exposure time under these conditions may be $\frac{1}{2000}$ of a second.

Figure 9:
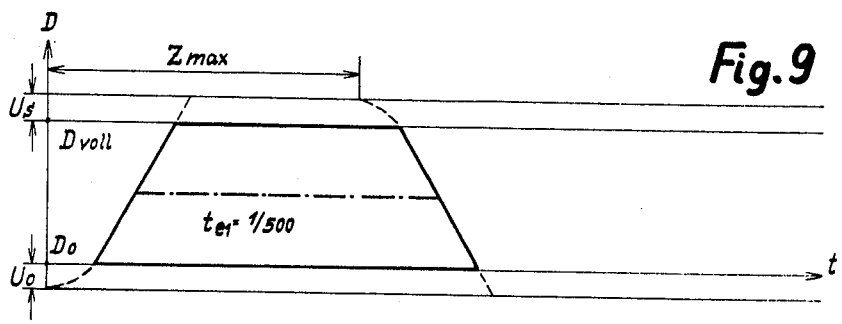

FIG. 9 represents the condition when the shutter is set for maximum spacing of the control pawl 44 away from the abutment shoulder 26oa of the first master member 26Oo; in other words, maximum time delay Zmax. of the commencement of running down of the second master member as compared with the time of commencement of running down of the first master member. In the specific example above mentioned, this gives an equivalent exposure of $\frac{1}{500}$ of a second.

Figure 10:
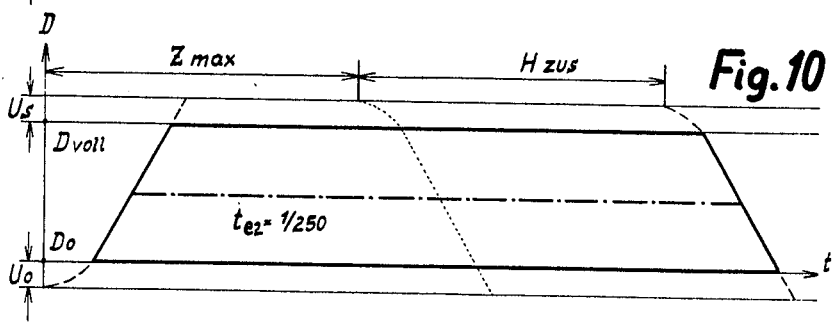

FIG. 10 represents the condition when a still slower exposure (of longer duration) is wanted. The time Zmax. remains the same as before, but for longer exposures a separate time delay gear train, of conventional construction well known in the art, is operatively connected to the second or shutter-closing master member so as to delay the running down thereof by a variable time represented at Hzus, this variable time Hzus being adjustable in conventional manner by turning the shutter speed control ring 52e. Thus the adjustable time delay Hzus is added to the time Zmax. in order to obtain exposures of any desired length longer than $\frac{1}{500}$ of a second; for example $\frac{1}{250}$ of a second.

Figure 11:
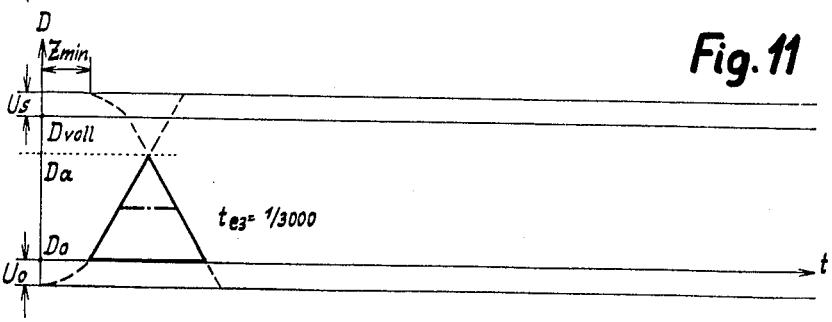

FIG. 11 represents the operation of the shutter for extremely fast exposures. Here, the differential gear train controlling the angular relationship of the pawls 42 and 44 with respect to each other, is set (by moving the speed control ring 52e and the control cam 52r) so as to bring the pawl 44 as close as possible to the abutment shoulder 26oa in the initial tensioned position of the parts, so that the time elapsing from the beginning of running down movement of the first master member to the beginning of running down movement of the second master member is the minimum possible time represented by Zmin. in FIG. 11. Under these conditions, as readily apparent from the diagram, the closing set of blades will begin to close and will start to overlap the exposure aperture before the opening set of blades reach their full open position. Thus the exposure aperture will never be completely open at any time during the exposure, but will open only to a diameter represented by the horizontal line Da in FIG. 11, rather than to the normal full aperture represented by Dvoll. This will result in an extremely fast equivalent shutter speed of, for example, $\frac{1}{3000}$ of a second.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising means defining an exposure aperture, a first blade system movable from closed position to open position with respect to said aperture to initiate an exposure, a second blade system independently movable from open position to closed position with respect to said aperture to terminate an exposure, drive means tending to move said second blade system from its open position to its closed position, latch means for latching said drive means to hold said second blade system open, and differential gear train means for releasing said latch means, said differential gear train means including an input member, a first sun gear operatively connected to said iput member to be driven thereby, a second sun gear operatively connected to said latch means to release said latch means by movement of said second sun gear, and planet pinion means meshing with both of said sun gears to drive the second sun gear from movement of the first sun gear, and means operative during movement of said first blade system from closed position toward open position for moving said input member of the differential gear train means, thereby to release said latch means so that said drive means may become operative to move said second blade system toward its closed position.

2. A construction as defined in claim 1, wherein both of said sun gears are mounted for rotation on a common axis, said construction further including an arm swingable about said common axis, said planet pinion means being mounted for rotation on said arm, and shutter speed control cam means for controlling the position of orientation of said arm.

3. A construction as defined in claim 2, further including a master member tending to drive said first blade system from closed position toward open position during a running-down movement of said master member, said input member of said gear train means lying in the path of running-down movement of said master member to be engaged and moved thereby during such running-down movement.

4. A construction as defined in claim 1, further including a master member tending to drive said first blade system from closed position toward open position during a running-down movement of said master member, said input member of said gear train means lying in the path of running-down movement of said master member to be engaged and moved thereby during such running-down movement.

5. A construction as defined in claim 4, further including a fixed abutment so placed that the end of the running-down movement of said master member, said input member of said gear train means is held immovably by engagement with said master member and said fixed abutment, and said output member of said gear train means is movable for adjustment.

6. A construction as defined in claim 1, characterized by the fact that when the shutter is in a tensioned condition ready for making an exposure, said output member of said gear train means is in frictional engagement with said drive means for said second blade system and held thereby against movement, and said input member is movable for adjustment.

7. A photographic shutter comprising a housing having a central opening defining an exposure aperture and an annular chamber surrounding said aperture, a series of shutter blade mounting posts in said chamber, spaced from each other in a direction circumferentially around said aperture, a first set of shutter blades and a second set of shutter blades, one blade of each set being mounted on each of said posts for swinging movement thereon from an open position in non-obstructing relation to said aperture to a closed position in which the blades of each set collectively close said exposure aperture, a first blade ring rotatably mounted in said chamber and pivotally connected to all of the blades of the first set to swing them by circumferential movement of the first blade ring, a second blade ring rotatably mounted in said chamber and pivotally connected to all of the blades of the second set to swing them by circumferential movement of the second blade ring, a first spring-powered driving member rotatable within said chamber from a tensioned position to a rest position and effective during such rotation to turn said first blade ring in only a single direction to swing said first set of blades from their closed position to their open position, a second spring-powered driving member rotatable within said chamber from a tensioned position to a rest position and effective during such rotation to turn said second blade ring in only a single direction to swing said second set of blades from their open position to their closed position, a releasable latch for holding said second driving member in its tensioned position, and adjustable means for releasing said latch at a variable time after the commencement of rotation of said first driving member, whereby said second driving member will commence to rotate to close said second set of blades at a variable time after said first driving member commences to rotate to open said first set of blades.

8. A construction as defined in claim 7, further including cooperating interengaging parts on said first driving member and first blade ring for positively holding said first blade ring in blade-open position so long as said first driving member remains in rest position, and cooperating interengaging parts on said second driving member and second blade ring for positively holding said second blade ring in blade-closed position so long as said second driving member remains in rest position.

9. A construction as defined in claim 8, further including a tensioning ring mounted for rotation in said chamber, a first abutment portion on said tensioning ring for engaging said first driving member during rotation of said tensioning ring in a single direction to turn said first driving member reversely from its rest position to its tensioned position to cause turning of said first blade ring from blade-open position to blade-closed position, and a second abutment portion on said tensioning ring for engaging said second driving member at a later time during the same rotation of said tensioning ring in said single direction, to turn said second driving member reversely from its rest position to its tensioned position to cause turning of said second blade ring from blade-closed position to blade-open position only after said first blade ring has reached its blade-closed position.

10. A photographic shutter comprising means defining an exposure aperture, a first set of shutter blades movable between closed position and open position with respect to said aperture, a second set of shutter blades movable separately from the first set of blades between open position and closed position with respect to said aperture, a first spring-powered driving member effective upon running down movement from tensioned position to rest position to move said first set of blades from closed position to open position, a second spring-powered driving member effective upon running down movement from tensioned position to rest position to move said second set of blades from open position to closed position, a releasable latch for holding said second driving member in tensioned position, and mechanism for releasing said latch at an adjustably variable time with relation to the running down movement of said first driving member, said mechanism for releasing said latch including planetary differential gearing having an input member turned by the running down movement of said first driving member, a first sun wheel fixed to said input member to turn therewith, an output member forming part of said latch, a second sun wheel fixed to said output member to turn therewith and concentrically with said first sun wheel, said two sun wheels being of different effective diameters, a planet wheel meshing with both of said sun wheels, and a planet wheel carrier swingable about the axis of rotation of said sun wheels to move said planet wheel to vary the orientation of one sun wheel relative to the other, thereby to adjust the exposure time.

11. A construction as defined in claim 10, characterized by the fact that said first set of shutter blades have a preliminary speeding up movement during the first part of the running down movement of the first driving member, before the first set of shutter blades begin to admit light through said exposure aperture, and further characterized by the fact that said second set of shutter blades have a preliminary speeding up movement during the first part of the running down movement of the second driving member, before the second set of shutter blades begin to obstruct passage of light through said exposure aperture.

References Cited by the Examiner

UNITED STATES PATENTS

| | | | |
|---|---|---|---|
| 2,354,168 | 7/1944 | Aiken | 95—63 |
| 2,463,206 | 3/1949 | Robertson | 95—63 |
| 2,800,844 | 7/1957 | Durst | 95—60 |
| 2,803,181 | 8/1957 | Willcox | 95—60 |

JOHN M. HORAN, *Primary Examiner.*